US010425005B2

(12) United States Patent
Henkel et al.

(10) Patent No.: US 10,425,005 B2
(45) Date of Patent: Sep. 24, 2019

(54) POWER SUPPLY UNIT

(71) Applicant: Phoenix Contact GmbH & Co. KG, Blomberg (DE)

(72) Inventors: Hartmut Henkel, Blomberg (DE); Jochen Zeuch, Blomberg (DE); Patrick Schweer, Hameln (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 399 days.

(21) Appl. No.: 15/306,176

(22) PCT Filed: Apr. 23, 2015

(86) PCT No.: PCT/EP2015/058751
§ 371 (c)(1),
(2) Date: Oct. 24, 2016

(87) PCT Pub. No.: WO2015/165788
PCT Pub. Date: Nov. 5, 2015

(65) Prior Publication Data
US 2017/0054361 A1     Feb. 23, 2017

(30) Foreign Application Priority Data

Apr. 28, 2014 (DE) ........................ 10 2014 105 915

(51) Int. Cl.
*H02H 3/00* (2006.01)
*H02M 1/32* (2007.01)
(Continued)

(52) U.S. Cl.
CPC ................ *H02M 1/32* (2013.01); *H02H 3/05* (2013.01); *H02H 3/08* (2013.01); *H02M 3/04* (2013.01); *H02M 1/16* (2013.01)

(58) Field of Classification Search
None
See application file for complete search history.

(56) References Cited

U.S. PATENT DOCUMENTS 6,320,766 B1    11/2001   Park
9,300,199 B2 *   3/2016   Yang ..................... H02M 1/32
(Continued)

FOREIGN PATENT DOCUMENTS

CN     101443977 A    5/2009
CN     100590944 C    2/2010
(Continued)

OTHER PUBLICATIONS

ISA/EP International Search Report, Int'l Application No. PCT/EP2015/058751, dated Jun. 25, 2015, European Patent Office, Rijswijk, NL, 31 pgs.

*Primary Examiner* — Stephen W Jackson
(74) *Attorney, Agent, or Firm* — Holland & Hart LLP (57) ABSTRACT

The present disclosure relates to a power supply unit having: an output for outputting an output current and an output voltage; and a protective element having a signal output path, wherein the protective element is connected downstream of the output and designed to maintain the signal output path when the output current exceeds a first amplitude threshold value and to interrupt the signal output path when the output current exceeds a second amplitude threshold value, the second amplitude threshold value being higher than the first amplitude threshold value; wherein the power supply unit is designed to reduce an amplitude of the output voltage and to increase an amplitude of the output current above the second amplitude threshold value, in order to interrupt the signal output path, when the output current exceeds the first amplitude threshold value.

20 Claims, 4 Drawing Sheets

(51) Int. Cl.
*H02H 3/05* (2006.01)
*H02H 3/08* (2006.01)
*H02M 3/04* (2006.01)
*H02M 1/16* (2006.01)

(56) References Cited

U.S. PATENT DOCUMENTS 9,602,018 B2 * 3/2017 Herfurth ............. H02M 3/3376
2002/0196004 A1 12/2002 Berson et al.

FOREIGN PATENT DOCUMENTS

| | | |
|---|---|---|
| DE | 10 2005 031 833 A1 | 1/2007 |
| DE | 10 2012 101 930 A1 | 9/2013 |
| EP | 1852951 A1 | 11/2007 |
| GB | 2012128 A | 7/1979 |
| JP | 2013-003784 A | 1/2013 |
| WO | WO-2010/110940 A1 | 9/2010 |
| WO | WO-2013/167199 A1 | 11/2013 |

* cited by examiner

POWER SUPPLY UNIT

CROSS-REFERENCE TO RELATED APPLICATIONS

The present application is a 371 national phase filing of International Application No. PCT/EP2015/058751, entitled "POWER SUPPLY UNIT", filed 23 Apr. 2015, which claims priority to German Patent Application No. 10 2014 105 915.8, entitled "ENERCAEVERSORGUNGSCiERÄT", filed 28 Apr. 2014.

BACKGROUND

The present disclosure relates to a power supply unit.

A power supply unit, such as a voltage supply unit for powering a consuming device with electrical energy, frequently has a protective element, such as a melting fuse or a line circuit breaker with electromagnetic triggering. The protective element may be designed to interrupt an electrically conducting connection between the power supply unit and the consuming device when an electrical current flowing through the protective element exceeds a predetermined threshold value. For example, in the event of a short circuit in the consuming device, the electrical current will rise. By interrupting the electrically conducting connection, an overloading of the power supply unit and overheating of the connecting lines between the power supply unit and the consuming device can be avoid.

The high electrical current needed for a brief period for interrupting the electrically conducting connection between the power supply unit and the consuming device is often provided at least partially by a capacitance, e.g. a capacitor, disposed in parallel with an output of the power supply unit. Frequently, the capacitance discharges in the event of a short circuit in the consuming device, with a discharge current which is difficult to control. This can result in overheating of connecting lines between the power supply unit and the consuming device. Further, another consuming device connected in series to the consuming device in question can be damaged. It is further noted that the duration during which the discharge current of the capacitance may flow is determined by the dimensioning of the capacitance, the resistance of the connecting lines, and the short-circuit resistance of the consuming device.

SUMMARY

It is an object of the present disclosure to provide for an efficient concept of triggering a protective element of a power supply unit.

The object is achieved by the subject matter having features according to the independent claims. Examples of the principles of this disclosure are the subject matter of the figures, the description, and the dependent claims.

According to a first aspect of the disclosure, the object is achieved by a power supply unit having an output for outputting an output current and an output voltage, and a protective element having a signal output path, wherein the protective element is connected downstream of the output and is designed to maintain the signal output path when the output current exceeds a first amplitude threshold value and to interrupt the signal output path when the output current exceeds a second amplitude threshold value, the second amplitude threshold value being higher than the first amplitude threshold value; wherein the power supply unit is designed to reduce an amplitude of the output voltage and to increase an amplitude of the output current above the second amplitude threshold value, in order to interrupt the signal output path, when the output current exceeds the first amplitude threshold value. This provides the advantage that the amplitude of the output current that is utilized to interrupt the signal output path can be limited in an efficient manner.

The power supply unit may be an electrical power supply unit, such as a voltage supply unit or a current supply unit. Further, the power supply unit may comprise a measurement means for measuring the amplitude of the output voltage, and/or a control means for setting the amplitude of the output current and/or the amplitude of the output voltage. E.g., the power supply unit comprises a microcontroller in which the measurement means and/or the control means are integrated, and which furthermore is designed to recognize when the first amplitude threshold value is exceeded by the measured amplitude of the output current.

The protective element may comprise a melting fuse, a line circuit breaker, e.g. a line circuit breaker with electromagnetic triggering, and/or a cold-line resistance.

The first amplitude threshold of the output current may be a first threshold value pre-stored in a memory of the power supply unit. The first threshold may be at, e.g., 0.01, 0.1, 1, 3, 5, 6, 8, 10, 12, 16, 20, 30, 40, 50, 75, 100, or 200 amps. Furthermore, the second amplitude threshold of the output current may be a second threshold value pre-stored in a memory of the power supply unit. The second threshold is, e.g., 0.01, 0.1, 1, 3, 5, 6, 8, 10, 12, 16, 20, 30, 40, 50, 75, 100, or 200 amps. The second amplitude threshold value of the output current may be at a value which corresponds to twice, three times, four times, five times, six times, seven times, eight times, nine times, or ten times the amplitude of the nominal output current of the power supply unit. The amplitude of the output voltage may heat 0.001, 0.01, 0.1, 1, 5, 10, 12, 15, 20, 24, 30, 40, 50, 75, 100, 250, 500, or 1000 volts.

In an advantageous example of the power supply unit, the power supply unit is designed to increase the amplitude of the output voltage following the reduction, if the amplitude of the output current is below a third amplitude threshold after passage of a predetermined time interval. This provides the advantage that after the interruption of the signal path of the protective element the power supply unit can again supply a second consumption device with electrical energy, which second device may be present and connected in parallel with the protective element.

The predetermined time interval may be 0.1, 0.5, 1, 2, 3, 4, 5, 6, 7, 8, 9, 10, 11, 12, 13, 14, 15, 20, 25, 30, 40, or 50 milliseconds. Further, the increase in the amplitude of the output current during the predetermined time interval may correspond to a short-time current increase. The third amplitude threshold value of the output current may be a third threshold value which is pre-stored in the memory of the power supply unit. The third threshold value is, e.g., 0.01, 0.1, 1, 3, 5, 6, 8, 10, 12, 16, 20, 30, 40 50, 75, 100, or 200 amps. Further, the third amplitude threshold value may be lower than the second amplitude threshold value.

According to another advantageous example of the power supply unit, the power supply unit is designed to again reduce the amplitude of the output voltage if the amplitude of the output current is higher than the third amplitude threshold value after the predetermined time interval. This provides the advantage that the electrical output power of the power supply unit can be reduced when the signal output path is not interrupted.

The power supply unit can reduce the amplitude of the output voltage such that a predetermined short circuit current of the power supply unit is established.

According to yet another advantageous example of the power supply unit, the unit is designed to again increase the amplitude of the output current, after expiration of a second predetermined time interval, to a value above the second amplitude threshold value, when the signal output path is not interrupted. This provides the advantage that another attempt to interrupt the signal output path may be tried.

The additional predetermined time interval may be a cooling time for cooling of components, such as connecting lines. Further, the additional predetermined time interval may be longer than the predetermined time interval. E.g., the additional predetermined time interval is 10, 25, 50, 75, 100, 250, 500, or 1000 times as long as the predetermined time interval.

According to still another advantageous example of the power supply unit, the power supply unit is designed to comprise a measuring device to measure the amplitude of the output current. This provides the advantage that the amplitude of the output current can be provided in an efficient way, so that it can be checked as to whether it is greater than or less than the respective amplitude threshold value.

The measuring device may comprise a current-measuring device with a shunt or a Hall probe. Furthermore, the measuring device may be incorporated in a microcontroller of the power supply unit.

In another advantageous example of the power supply unit, the power supply unit is designed to comprise a control device for setting the amplitude of the output current or the amplitude of the output voltage. This provides the advantage that the amplitude of the output current or the amplitude of the output voltage can be set in an efficient manner.

The control device may comprise a controllable potentiometer for setting the amplitude of the output current or the amplitude of the output voltage. Further, the control device may be integrated in a microcontroller of the power supply unit.

According to another advantageous example of the power supply unit, the protective element comprises a line circuit breaker, particularly a line circuit breaker with electromagnetic triggering. This provides the advantage that an efficient protective element can be used.

The line circuit breaker may comprise a relay or a contactor for interrupting the signal output path. Further, the line circuit breaker may be designed such that the interruption of the signal output path can be reversed by a user. E.g., for this purpose the line circuit breaker comprises a switch for reestablishing the signal output path.

According to yet another advantageous example of the power supply unit, the protective element comprises a melting fuse. This provides the advantage that the signal output path can be interrupted in a permanent manner.

The melting fuse may comprise a meltable conductor which can melt in order to permanently interrupt the signal output path.

According to still another advantageous example of the power supply unit, the protective element comprises a cold-conductor resistance. This provides the advantage that the interrupted signal output path of the protective element can be reestablished after passage of a cooling time, without interaction from the user.

The cold conductor resistance may be a positive temperature coefficient (PTC) resistance.

According to another advantageous example of the power supply unit, the protective element is disposed in a housing of the power supply unit, and an additional output for outputting the output current and output voltage is connected downstream of the protective element, with the signal output path being disposed between the output and the additional output. This provides the advantage that the power supply unit can have a particularly compact construction.

In another advantageous example of the power supply unit, the respective amplitude threshold value can be set via a user interface or is pre-stored. This provides the advantage that the respective amplitude threshold value may be provided in an efficient manner.

The respective amplitude threshold value may be pre-stored in a memory of the power supply unit. Further, the user interface may comprise an optical display element, e.g. a liquid crystal display, for displaying the respective amplitude threshold value.

According to yet another advantageous example of the power supply unit, the user interface comprises a communications interface or an actuating element, for setting the respective amplitude threshold value. This provides the advantage that the power supply unit can be adjusted in an efficient manner.

The communications interface may comprise a wire-connected and/or a wireless communications interface. E.g., the communications interface comprises: a serial interface, an interface according to the Power Management Bus (PM-Bus) standard, an interface according to the Universal Serial Bus (USB) standard, an interface for wireless communication by Radio Frequency Identification (RFID), e.g. according to the ISO/IEC 14443 or ISO/IEC 18000-3 standard, an interface for wireless communication according to the Near-Field Communication (NFC), e.g. according to the ISO/IEC 14443 or ISO/IEC 18092 standard, or an interface for wireless communication according to any one of the Bluetooth, ZigBee, or Wireless Local Area Network (W-LAN) standards.

The actuating element may comprise a pushbutton, keypad, or rotary knob, e.g. for controlling a potentiometer, and/or a switch.

According to an example, the increase of the amplitude of the output current above the second amplitude threshold value, when the output current has exceeded the first amplitude threshold value, can be reversed by means of the communications interface or the actuating element.

According to another advantageous example of the power supply unit, the power supply unit is designed to be able to set the amplitude of the output voltage or the amplitude of the output current based on an amplitude value of a supply voltage of the power supply unit, in order to reduce the electric power uptake of the power supply unit. This provides the advantage that an interruption in the supply voltage of the power supply unit as a result of increased energy consumption by the power supply unit can be avoided.

For example, the increase of the amplitude of the output current above the second amplitude threshold value is reversed, when the output current exceeds the first amplitude threshold value, if an amplitude of the supply voltage falls below a predetermined threshold value.

According to a second aspect of the disclosure, the object of the disclosure is achieved by a method of supplying a consuming device with electrical energy by means of a power supply unit, wherein a protective element having a signal output path is connected downstream of an output of the power supply unit for outputting an output current and an output voltage, wherein the protective element is designed to maintain the signal output path when the output current exceeds a first amplitude threshold value, and to interrupt the signal output path when the output current exceeds a second amplitude threshold value, wherein the second amplitude threshold value is higher than the first amplitude threshold value, comprising: measuring an amplitude of the output current, and reducing an amplitude of the output voltage, and increasing the amplitude of the output current above the second amplitude threshold value when the output current exceeds the first amplitude threshold value, in order to interrupt the signal output path.

This provides the advantage that the amplitude of the output current employed for interrupting the signal output path can be limited in an efficient manner.

The first amplitude threshold value of the output current may be a first threshold value pre-stored in a memory of the power supply unit. The first threshold value is, e.g., 0.01, 0.1, 1, 3, 5, 6, 8, 10, 12, 16, 20, 30, 40, 50, 75, 100, or 200 amps. Furthermore, the second amplitude threshold value of the output current may be a second threshold value pre-stored in a memory of the power supply unit. The second threshold value is, e.g., 0.01, 0.1, 1, 3, 5, 6, 8, 10, 12, 16, 20, 30, 40, 50, 75, 100, or 200 amps. The second amplitude threshold value of the output current may be at a value which corresponds to twice, three times, four times, five times, six times, seven times, eight times, nine times, or ten times the amplitude of the nominal output current of the power supply unit. The amplitude of the output voltage may be 0.001, 0.01, 0.1, 1, 5, 10, 12, 15, 20, 24, 30, 40, 50, 75, 100, 250, 500, or 1000 volts.

According to an advantageous example of the method, the method comprises: increasing the amplitude of the output voltage if the amplitude of the output current after expiration of a predetermined time interval is lower than a third amplitude threshold value. This provides the advantage that after interruption of the signal output path of the protective element a second consuming device connected in parallel with the protective element can be further supplied with electrical energy.

The predetermined time interval may be 0.1, 0.5, 1, 2, 3, 4, 5, 6, 7, 8, 9, 10, 11, 12, 13, 14, 15, 20, 25, 30, 40, or 50 milliseconds. Further, the increase in the amplitude of the output current during the predetermined time interval may correspond to a short-time current increase. The third amplitude threshold value of the output current may be a third threshold value which is pre-stored in the memory of the power supply unit. The third threshold value is, e.g., 0.01, 0.1, 1, 5, 6, 8, 10, 12, 16, 20, 30, 40, 50, 75, 100, or 200 amps. Further, the third amplitude threshold value may be lower than the second amplitude threshold value.

According to another advantageous example of the method, the method comprises a new reduction of the amplitude of the output voltage when the amplitude of the output current exceeds the third amplitude threshold value, following expiration of the predetermined time interval. This provides the advantage that the output power delivered by the power supply unit can be reduced if the signal output path is not interrupted.

BRIEF DESCRIPTION OF THE DRAWINGS

Examples of the principles of this disclosure are illustrated in the drawings, and will be described in more detail herein below.

DETAILED DESCRIPTION

Figure 1:
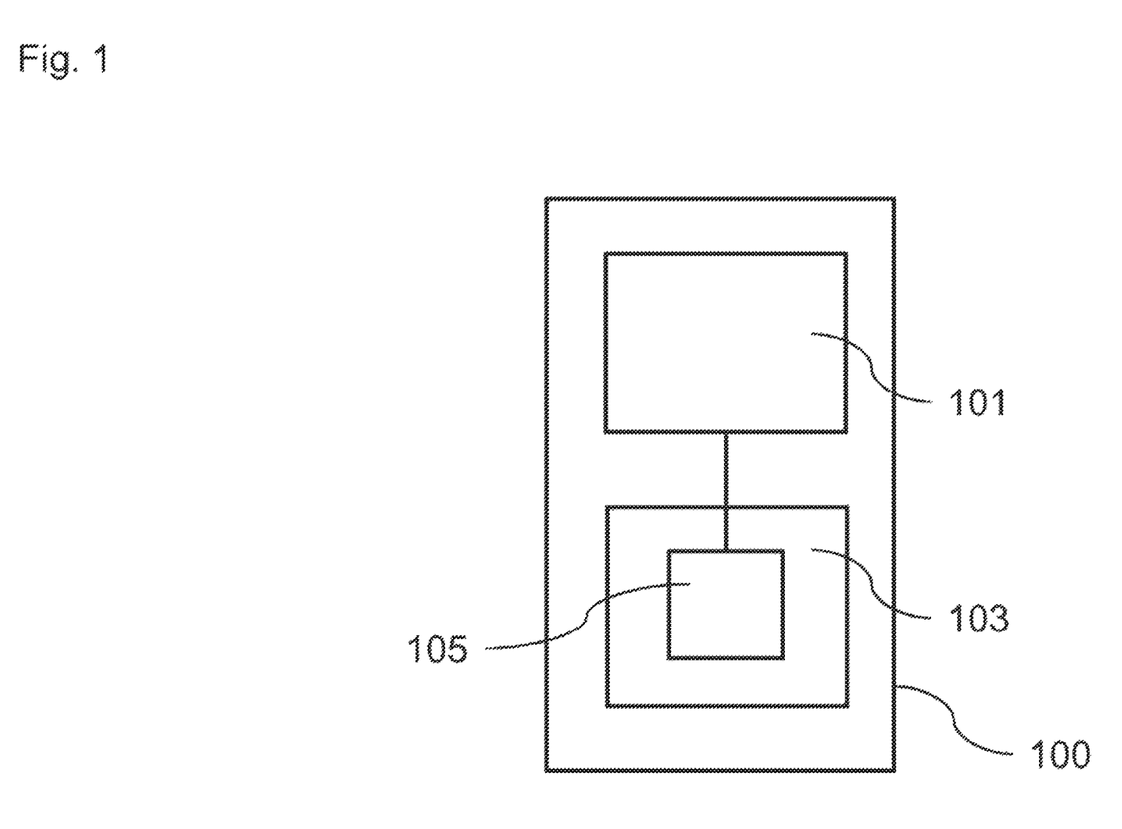
FIG. 1 shows a schematic diagram of a power supply unit.

FIG. 1 illustrates a schematic diagram of a power supply unit 100 according to an example of the principles of this disclosure. The power supply unit 100 is comprised of an output 101 and a protective element 103 with a signal output path 105.

The power supply unit 100 is designed having: the output 101 for delivering an output current and an output voltage; and the protective element 103 with the signal output path 105, which protective element 103 is connected downstream of the output 101 and is designed such that when the output current exceeds a first amplitude threshold value the signal output path 105 is maintained, and when the output current exceeds a second amplitude threshold value the signal output path 105 is interrupted, with the second amplitude threshold value being higher than the first amplitude threshold value, wherein the power supply unit 100 is designed to reduce an amplitude of the output voltage, and to increase an amplitude of the output current above the second amplitude threshold value, when the output current exceeds the first amplitude threshold value, so as to interrupt the signal output path 105.

The power supply unit 100 may be an electric power supply unit such as a voltage supply device or a current supply device. Further, the power supply unit 100 may comprise a measuring device for measuring the amplitude of the output voltage, and/or a control device for adjusting the amplitude of the output current and or the amplitude of the output voltage. For example, the power supply unit 100 comprises a microcontroller in which the measurement device and/or the control device are integrated, and which furthermore is designed to recognize if the measured amplitude of the output current exceeds the first amplitude threshold value.

The protective element 103 may comprise a melting fuse, a line circuit breaker, e.g. a line circuit breaker with electromagnetic triggering, and/or a cold-line resistance.

The first amplitude threshold value of the output current may be a first threshold value pre-stored in a memory of the power supply unit 100. The first threshold value is, e.g., 0.01, 0.1, 1, 3, 5, 6, 8, 10, 12, 16, 20, 30, 40, 50, 75, 100, or 200 amps. Furthermore, the second amplitude threshold value of the output current may be a second threshold value pre-stored in a memory of the power supply unit 100. The second threshold value is, e.g., 0.01, 0.1, 1, 3, 5, 6, 8, 10, 12, 16, 20, 30, 40, 50, 75, 100, or 200 amps. The second amplitude threshold value of the output current may be at a value which corresponds to twice, three times, four times, five times, six times, seven times, eight times, nine times, or ten times the amplitude of the nominal output current of the power supply unit 100. The amplitude of the output voltage may be at 0.001, 0.01, 0.1, 1, 5, 10, 12, 15, 20, 24, 30, 40, 50, 75, 100, 250, 500, or 1000 volts.

Figure 2:
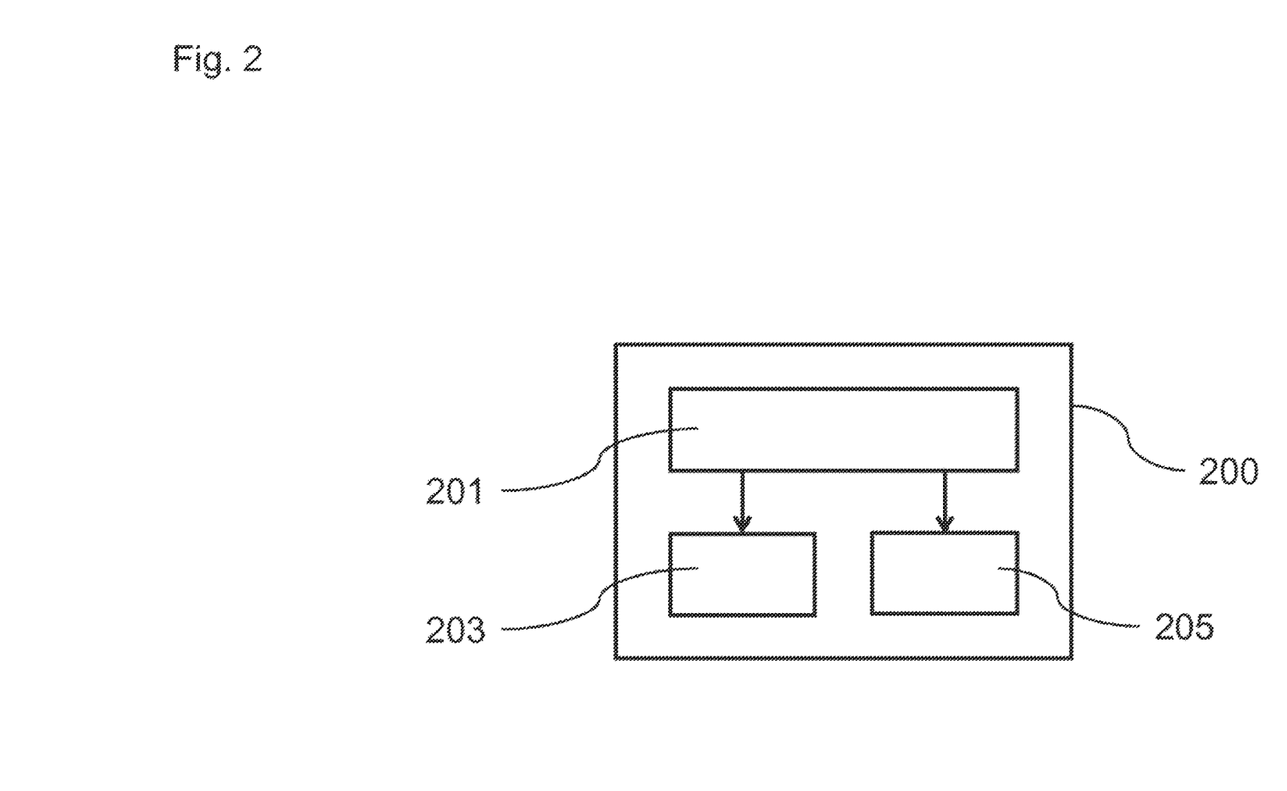
FIG. 2 shows a schematic diagram of a method of supplying a consuming device with electrical energy by means of a power supply unit.

FIG. 2 illustrates a schematic diagram of a method 200 for supplying a consuming device with electrical energy by means of a power supply unit 100. The method 200 comprises the method steps of measuring 201, reducing 203, and increasing 205.

The method 200 for supplying a consuming device with electrical energy by means of a power supply unit 100, wherein a protective element 103 with a signal output path 105 is connected downstream of an output 101 of the power supply unit 100 for supplying an output current and an output voltage, wherein the protective element 103 is designed to maintain the signal output path 105 when the output current exceeds a first amplitude threshold value, and to interrupt the signal output path 105 when the output current exceeds a second amplitude threshold value, wherein the second amplitude threshold value is higher than the first amplitude threshold value, comprising: measuring 201 an amplitude of the output circuit, reducing 203 an amplitude of the output voltage, and increasing 205 the amplitude of the output current above the second amplitude threshold value when the output current exceeds the first amplitude threshold value, in order to interrupt the signal output path 105.

Figure 3:
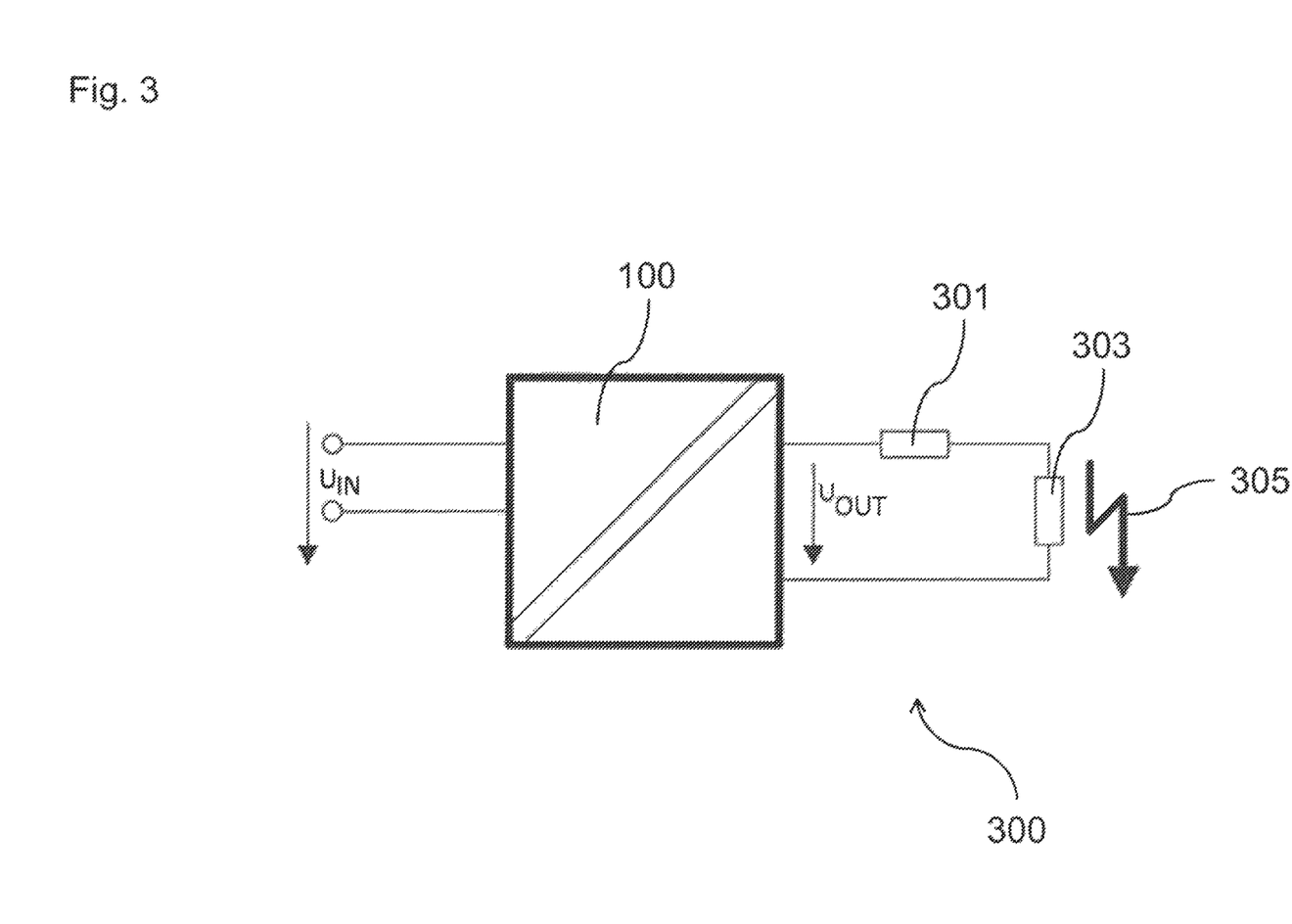
FIG. 3 shows an arrangement for supplying a consuming device with electrical energy by means of a power supply unit.

FIG. 3 illustrates an arrangement 300 for supplying a consuming device 303 with electrical energy by means of a power supply unit 100. Furthermore, a supply voltage $U_{IN}$, an output voltage $U_{OUT}$, a line resistance 301, and a malfunction 305 of the consuming device 303 are illustrated.

The power supply unit 100 is supplied with the supply voltage $U_{IN}$, and delivers the output voltage $U_{OUT}$ to power the consuming device 303. In the event of a malfunction 305 of the consuming device 303, such as a short circuit, a defect, or a failure, the output current corresponding to the output voltage $U_{OUT}$ can be delivered, via the line resistance 301 of the electrical connecting line and the short circuit resistance or overload of the consuming device 303. When the said corresponding output current exceeds the first amplitude threshold value, the power supply unit 100 can reduce the amplitude of the output voltage $U_{OUT}$ and can raise an amplitude of the corresponding output current above the second amplitude threshold value, in order to interrupt the signal output path 105.

The line resistance 301 may be 1, 5, 10, 25, 50, 75, 100, 125, 150, 175, or 200 milliohms.

According to an example, an electric power or energy of the power supply unit 100 can be drawn in a regulated fashion via a power path of the power supply unit 100, instead of drawing the electric power or energy via non-regulable output capacitors. E.g. the electric power (or energy) may be drawn directly from the powering network of the power supply unit 100, in particular via the supply voltage $U_{IN}$.

Figure 4:
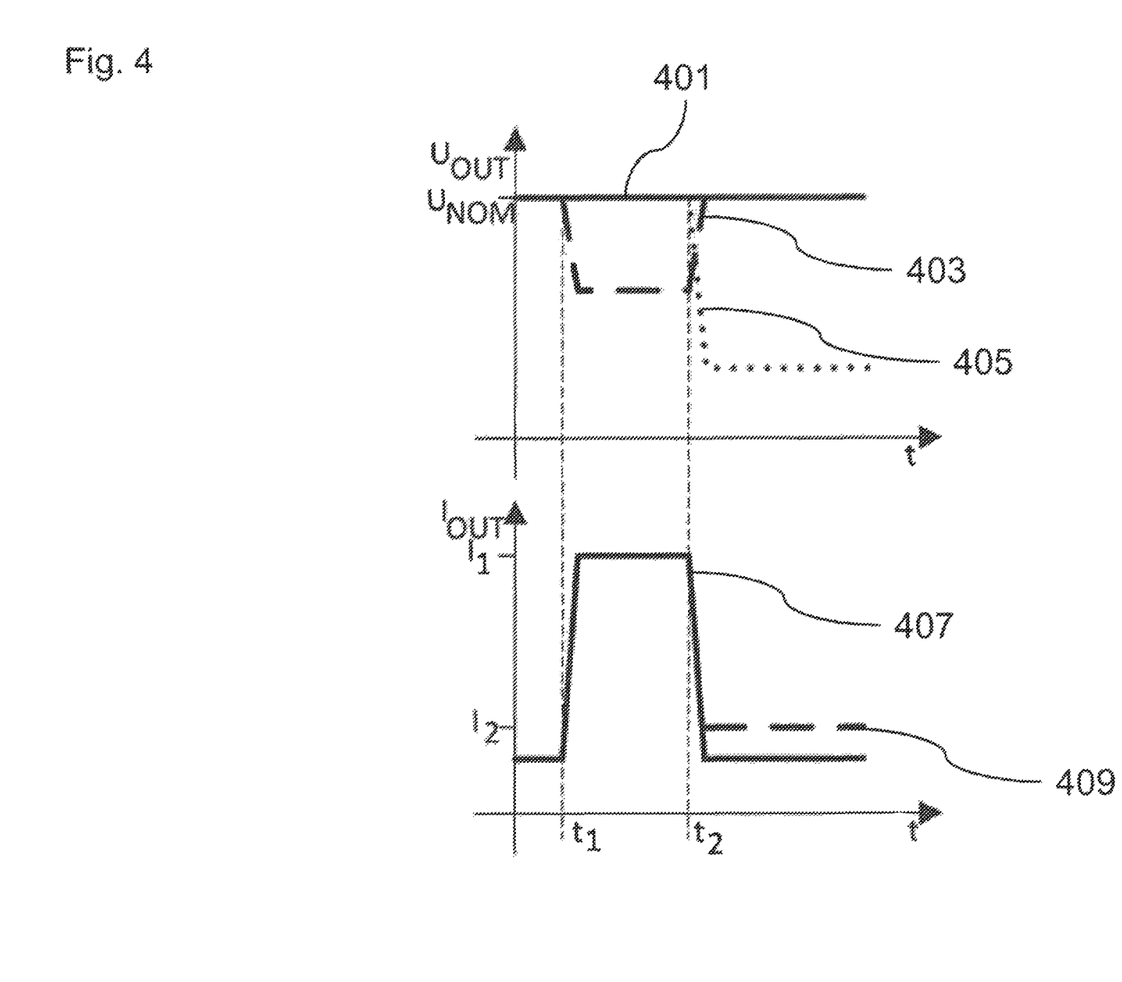
FIG. 4 shows plots of an output voltage and an output current of a power supply unit for supplying a consuming device with electrical energy.

FIG. 4 shows plots of an output voltage $U_{OUT}$ and of an output current $I_{OUT}$, of a power supply unit 100 for supplying electrical energy to a consuming device 303. A first output voltage plot 401, a second output voltage plot 403, and a third output voltage plot 405, of the output voltage $U_{OUT}$, as a function of time t, are shown. Also a first output current plot 407 and a second output current plot 409, of the output current $I_{OUT}$, as a function of time are shown.

In the first output voltage plot 401, the output voltage $U_{OUT}$ is permanently set to a nominal output voltage $U_{NOM}$. If at the first time point $t_1$ a malfunction 305, such as a short circuit, occurs in the consuming device 303, the output current $I_{OUT}$ following the first output plot 407 can be increased to a maximum output current $I_1$, in order to interrupt the signal output path 105. The maximum output current $I_1$ may be limited by the line resistance 301 of the electrical connecting line and the short circuit resistance or overload of the consuming device 303. If at the second time point $t_2$ the signal output path 105 is interrupted or if a protective element 103, e.g. a fuse, which is connected in series with the consuming device 303, is triggered, then the output current $I_{OUT}$ may be reduced.

In the second output voltage plot 403, the output voltage $U_{OUT}$ is set to the nominal output voltage $U_{NOM}$ at the start. If at the first time point $t_1$ a malfunction 305, such as a short circuit, occurs in the consuming device 303, the output current $I_{OUT}$ following the second output plot 409 may be increased to a maximum output current $I_1$, in order to interrupt the signal output path 105, while the output voltage $U_{OUT}$ is reduced. The maximum output current $I_1$ may be limited by the line resistance 301 of the electrical connecting line and the short circuit resistance or overload of the consuming device 303. If at the second time point $t_2$ the signal output path 105 is interrupted or if a protective element 103, e.g. a fuse, which is connected in series with the consuming device 303, is triggered, then the output current $I_{OUT}$ may be reduced to the nominal output current $I_2$, and the output voltage $U_{OUT}$ may be increased to the nominal output voltage $U_{NOM}$.

In the third output voltage plot 403, the output voltage $U_{OUT}$ is set to the nominal output voltage $U_{NOM}$ at the start. If at the first time point $t_1$ a malfunction 305, such as a short circuit, occurs in the consuming device 303, the output current $I_{OUT}$ following the first output plot 407 can be increased to a maximum output current $I_1$, in order to interrupt the signal output path 105. The maximum output current $I_1$ may be limited by the line resistance 301 of the electrical connecting line and the short circuit resistance or overload of the consuming device 303. If at the second time point $t_2$ the signal output path 105 is not interrupted or if a protective element 103, e.g. a fuse, which is connected in series with the consuming device 303, is not triggered, e.g. because the maximum output current $I_1$ is less than the second amplitude threshold value, then the output voltage $U_{OUT}$ may be reduced further, and a short circuit current can be established in the power supply unit 100. This may be the case, e.g., if no fuse or a too large fuse is connected upstream of the consuming device 303.

According to one example, the increasing 205 of the output current $I_{OUT}$ to the maximum output current $I_1$ may be carried out repeatedly, in order to eventually interrupt the signal output path 105 in one of the repetitions. A recovery time may be provided between the repetitions, e.g. equal to the additional predetermined time interval, for cooling of the components.

According to another embodiment, the plots may be analogously valid or apply for a current-supply unit, with the terms voltage and current being interchanged.

According to yet another embodiment, when a malfunction 305 occurs under circumstances of a low line resistance 301 of the electrical connecting line and a low short circuit resistance or a low overload of the consuming device 303, a higher output current $I_{OUT}$ or peak current may be set, if a capacitance is connected in parallel to the output 101. On the other hand, if the short-time current increases with reducing 203 of the output voltage $U_{OUT}$, the output current $I_{OUT}$ can be limited.

According to still another example, standard consuming devices connected in parallel to the consuming device 303 can bridge over the reducing 203 of the output voltage $U_{OUT}$ for a short period of time, e.g. a few milliseconds. E.g., the standard EN 61131 for memory-programmable control devices requires a time period of 10 msec.

In another example, a line circuit breaker with magnetic triggering may interrupt a signal output path associated with the line circuit breaker within 10 msec, or may trigger it within 10 msec. Accordingly, a line circuit breaker with magnetic triggering may be employed as a protective element for a standard consuming device according to standard EN 61131 for memory-programmable control devices.

According to another example, output capacitors can provide the output current $I_{OUT}$ needed for interrupting the signal output path for only a short time, for, in particular, a power supply unit 100 with an output voltage $U_{OUT}$ of 24 V and an output current $I_{OUT}$ of 20 or 40 A. Here, the length of the time interval may depend on the value of the remaining resistances, such as the line resistance 301.

According to still another example, due to the short pulse duration of a few milliseconds, such as the predetermined time interval, all of the components in an output path of the power supply unit 100 can be designed for the increased electrical load. This can be done based on operating safety and thermal capacity. Only a small additional heating is expected, as a result of the substantially longer pauses, such as the additional predetermined time interval between the pulses or the increasing 205 of the output current $I_{OUT}$. If the power source of the power supply unit 100 is designed to provide the required electrical power or energy, with correspondingly low resistance, then the required power or energy can be distributed between a mains connection and an input electrolytic capacitor. This can be achieved if the power source is comprised of an alternating current connection for low voltage networks having an alternating voltage of 120 or 230 VAC.

According to yet another example, the power source of the power supply unit 100 may be substantially loaded, as a result of the high power uptake of the power supply unit 100. The supply voltage $U_{IN}$ or a supplying voltage may fall, in the event of a limited power source or as a result of an inner resistance of the source and a resistance of a supply line. Particularly in the case of a DC/DC converter, this voltage drop can result in a minimum input voltage for the DC/DC converter being undercut, and shutting off of a power supply unit 100 designed as a DC/DC converter, or shutting off of a consuming device connected in parallel with the power supply unit 100. In order to limit this voltage drop, if the supply voltage $U_{IN}$ decreases below a threshold value, the electric power delivered by the power supply unit 100 can be limited such that no additional voltage decrease occurs. This can result in reversal of the increasing 205 of the output current $I_{OUT}$ or of the increasing of the short-time current. Further, the threshold value may be above a shutoff threshold value of the power supply unit 100.

In another example, the increasing 205 of the output current $I_{OUT}$ or the increasing of the short-time current can be deactivated by a user. This can be enabled only with difficulty in the event that output capacitors are connected.

According to another example, a high output current $I_{OUT}$ may result when an output capacitor is used and a low-resistance short circuit occurs in the consuming device. When a high-resistance short circuit occurs, only a small amount of electrical energy will be available for interrupting the signal output path 105, due to the exponential discharging of the output capacitor. To increase the electrical energy, an output capacitor with a correspondingly higher capacitance may be employed. The repeatability of the increasing 205 of the output current $I_{OUT}$ or the pulse is difficult to achieve if an output capacitor is used, because the output capacitor can only be charged in a difficult way without remedying the malfunction 305 or without opening the short circuit.

All of the features described and illustrated in connection with particular embodiments of the principles described herein may be provided in various combinations within the scope of this disclosure in order to simultaneously realize their advantageous effects.

The scope of protection of the invention is provided by the claims, and is not limited to the features elucidated in the description or illustrated in the drawings.

LIST OF REFERENCE NUMERALS

100 Power supply unit
101 Output
103 Protective element
105 Signal output path
200 Method
201 Measuring
203 Reducing
205 Increasing
300 Arrangement
301 Line resistance
303 Consuming device
305 Malfunction
401 First plot of output voltage
403 Second plot of output voltage
405 Third plot of output voltage
407 First plot of output current
409 Second plot of output current
$U_{IN}$ Supply voltage
$U_{OUT}$ Output voltage
$U_{NOM}$ Nominal output voltage
$I_{OUT}$ Output current
$I_1$ Maximum output current
$I_2$ Nominal output current
t Time
$t_1$ First time point
$t_2$ Second time point

What is claimed is:

1. A power supply unit, comprising:
an output configured to deliver an output current and an output voltage; and
a protective element having a signal output path, wherein the protective element is connected downstream of the output and is configured to maintain the signal output path when the output current exceeds a first amplitude threshold value and to interrupt the signal output path when the output current exceeds a second amplitude threshold value, the second amplitude threshold value being higher than the first amplitude threshold value,
wherein the power supply unit is configured to reduce an amplitude of the output voltage and to increase an amplitude of the output current above the second amplitude threshold value, in order to interrupt the signal output path when the output current exceeds the first amplitude threshold value.

2. The power supply unit according to claim 1, wherein the power supply unit is configured to increase the amplitude of the output voltage following the reduction when the amplitude of the output current is below a third amplitude threshold value following expiration of a predetermined time interval.

3. The power supply unit according to claim 1, wherein the power supply unit is configured to again reduce the amplitude of the output voltage when the amplitude of the output current is above the third amplitude threshold value following expiration of the predetermined time interval.

4. The power supply unit according to claim 1, further comprising a measuring device configured to measure the amplitude of the output current.

5. The power supply unit according to claim 1, further comprising a control device configured to set the amplitude of the output current or of the output voltage.

6. The power supply unit according to claim 1, wherein the protective element comprises a line circuit breaker with electromagnetic triggering.

7. The power supply unit according to claim 1, wherein the protective element comprises a melting fuse.

8. The power supply unit according to claim 1, wherein the protective element comprises a cold-conductor resistance.

9. The power supply unit according to claim 1, wherein the protective element is disposed in a housing of the power supply unit and wherein an additional output configured to deliver the output current and the output voltage is connected downstream of the protective element, (103), wherein the signal output path is disposed between the output and the additional output.

10. The power supply unit according to claim 1, further comprising a user interface configured to set or pre-store one or more of: the first amplitude threshold value, the second amplitude threshold value, or the third amplitude threshold value, amplitude threshold value.

11. The power supply unit according to claim 10, wherein the user interface comprises a communications interface or an actuating element configured to set the respective amplitude threshold value.

12. The power supply unit according to claim 1, wherein the power supply unit is configured to set the amplitude of the output voltage or the amplitude of the output current based on an amplitude value of a supply voltage of the power supply unit in order to reduce an electric power uptake of the power supply unit.

13. A method for supplying a consuming device with electrical energy by means of a power supply unit, comprising:
  measuring an amplitude of an output current of a power supply unit; and
  reducing an amplitude of an output voltage of the power supply unit and increasing the amplitude of the output current above a second amplitude threshold value when the output current exceeds a first amplitude threshold value, in order to trigger a protective element, connected downstream of an output of the power supply unit, to interrupt a signal output path of the protective element;
  wherein the protective element is configured to maintain the Rail signal output path when the output current exceeds the first amplitude threshold value and to interrupt the signal output path when the output current exceeds a second amplitude threshold value, wherein the second amplitude threshold value is higher than the first amplitude threshold value.

14. The method according to claim 13, further comprising:
  increasing the amplitude of the output voltage if the amplitude of the output current is below a third amplitude threshold value following expiration of a predetermined time interval.

15. The method according to claim 13, further comprising:
  reducing again the amplitude of the output voltage, if the amplitude of the output current is above the third amplitude threshold value after expiration of the predetermined time interval.

16. The method of claim 13, further comprising:
  setting or pre-storing one or more of: the first amplitude threshold value, the second amplitude threshold value, or the third amplitude threshold value.

17. The method of claim 13, further comprising:
  setting the amplitude of the output voltage or the amplitude of the output current based on an amplitude value of a supply voltage of the power supply unit in order to reduce an electric power uptake of the power supply unit.

18. The power supply unit of claim 4, wherein the measuring device comprises a shunt or a Hall probe.

19. The power supply unit of claim 4, wherein the measuring device is incorporated into a microcontroller of the power supply unit.

20. The power supply unit of claim 5, wherein the control device comprises a potentiometer.

* * * * *